(12) United States Patent
Bottler et al.

(10) Patent No.: US 11,046,031 B2
(45) Date of Patent: Jun. 29, 2021

(54) COMPOSITE PART MANUFACTURE

(71) Applicant: AIRTECH Europe S.à r.l., Differdange (LU)

(72) Inventors: Oliver Bottler, Konz (DE); Franck Louis, Folschviller (FR)

(73) Assignee: AIRTECH Europe S.à r.l., Differdange (LU)

( * ) Notice: Subject to any disclaimer, the term of this patent is extended or adjusted under 35 U.S.C. 154(b) by 35 days.

(21) Appl. No.: 15/771,483

(22) PCT Filed: Nov. 12, 2015

(86) PCT No.: PCT/EP2015/076467
§ 371 (c)(1),
(2) Date: Apr. 27, 2018

(87) PCT Pub. No.: WO2017/080607
PCT Pub. Date: May 18, 2017

(65) Prior Publication Data
US 2018/0339470 A1    Nov. 29, 2018

(51) Int. Cl.
*B29C 70/54*    (2006.01)
*B29C 70/34*    (2006.01)
*B29C 37/00*    (2006.01)

(52) U.S. Cl.
CPC .......... *B29C 70/54* (2013.01); *B29C 37/0064* (2013.01); *B29C 70/342* (2013.01)

(58) Field of Classification Search
CPC ........ B29C 66/00145; B29C 66/81455; B29C 70/443; B29C 70/48; B29C 70/54; B29C 70/342; B29C 37/0064; B32B 37/10; B32B 37/1018

USPC .................................................. 156/285, 286
See application file for complete search history.

(56) References Cited

U.S. PATENT DOCUMENTS

| | | | | |
|---|---|---|---|---|
| 3,510,393 A | * | 5/1970 | Margason | C03B 37/083 428/398 |
| 4,216,047 A | * | 8/1980 | Hilliard | B29C 37/0032 156/285 |
| 4,902,215 A | * | 2/1990 | Seemann, III | B29C 43/56 425/406 |
| 4,942,013 A | * | 7/1990 | Palmer | B29C 43/3642 156/285 |
| 8,940,222 B2 | | 1/2015 | Dull | |

(Continued)

FOREIGN PATENT DOCUMENTS

DE    102012219226 A1 *   4/2014
RU    2285613 C1          10/2006

(Continued)

OTHER PUBLICATIONS

Definition of "elongate" from dictionary.com date unknown.*

(Continued)

*Primary Examiner* — John L Goff, II
(74) *Attorney, Agent, or Firm* — Michael Best & Friedrich LLP

(57) ABSTRACT

A method of manufacturing a composite part where a layup is covered with a vacuum bag to which a reduced pressure is applied, the method including providing a uncompressible breather element between the layup and the bag to assist with airflow over a surface of the layup.

9 Claims, 5 Drawing Sheets

(56) References Cited

U.S. PATENT DOCUMENTS

2006/0266472 A1\* 11/2006 Kipp .................. B29C 70/44
  156/286
2008/0044506 A1   2/2008 Zahlen et al.
2015/0224721 A1\* 8/2015 Bendel ................ B29C 70/342
  416/226

FOREIGN PATENT DOCUMENTS

RU    2480335 C1    4/2013
WO    8502365       6/1985

OTHER PUBLICATIONS

The Russian Federal Service for Intellectual Property Search Report for Application No. 2018119497/05, dated Mar. 13, 2019, 2 pages.
International Search Report for Application No. PCT/EP2015/076467 dated Aug. 4, 2016 (2 pages).
International Preliminary Report on Patentability for Application No. PCT/EP2015/076467 dated Oct. 6, 2017 (36 pages).

\* cited by examiner

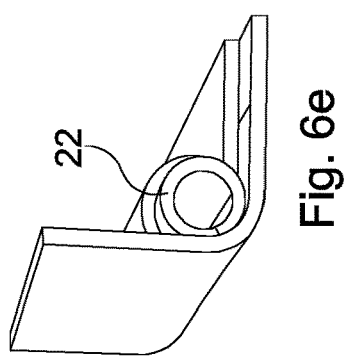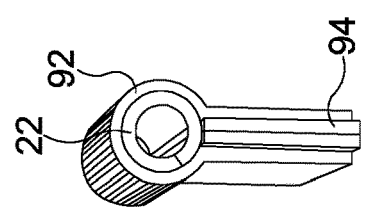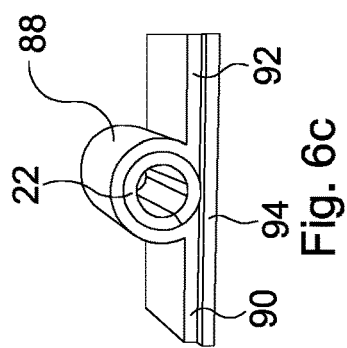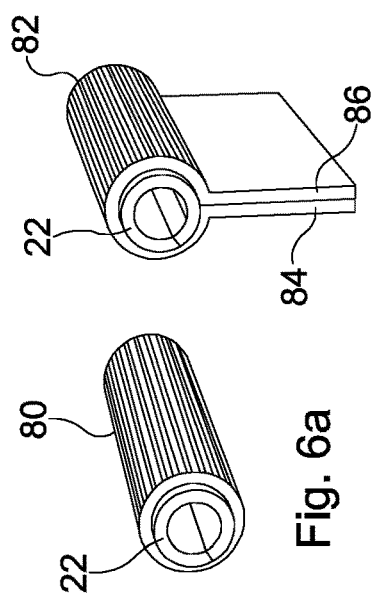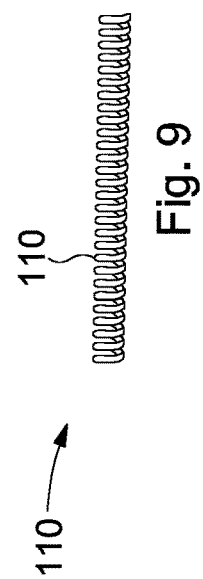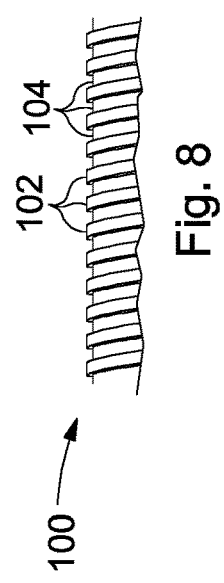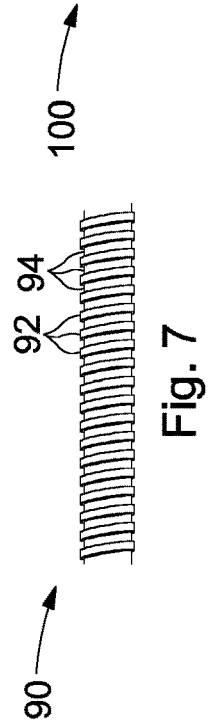

COMPOSITE PART MANUFACTURE

TECHNICAL FIELD

Embodiments of the invention relate to a method of manufacturing a composite part. In particular, embodiments of the invention relate to methods of manufacturing composite parts using vacuum bags, and devices for use in such methods. It is intended to market products relating to this invention under the name "ABS (Airtech Breather System)".

BACKGROUND

The manufacture of composite parts may use the 'vacuum bagging' technique. In this manner of manufacture, typically the composite part is first prepared as a layup which is then inserted into a bag and a reduced pressure is applied to the bag while the bagged layup is cured under increased temperature and pressure in an autoclave.

It is important that fluid flow is maintained between the bag and the layup to both ensure that the reduced pressure is evenly applied between the bag and the surface of the layup, and to ensure that the volatiles produced during the curing process can escape. To assist in airflow between the bag and the layup it is known to insert a breather material between the layup and the bag. Different forms of breather material are known. For example, woven materials such as glass fibre fabric which are heat resistant provide effective breather materials. Non-woven breather materials are also used.

Such breather materials are generally uniformly applied between the surface of the layup and the bag. However, it has been found that the airflow can be interrupted at the edges where the layup meets the tool and for these locations specific edge breathers have been proposed. An example of such an edge breather is disclosed in U.S. Pat. No. 8,940,222.

It is also known to use spiral polyethylene or nylon wraps to assist in fluid flow in resin infusion processes. However, these wraps are not able to withstand the increased pressure and temperature in an autoclave.

However, it has been found that difficulties still arise in maintaining a consistent airflow over the entire surface of the layup, particularly where the layup has corners or edges and, in general when the dimensions and shape of the layup interrupt airflow over the surface.

SUMMARY OF THE INVENTION

An embodiment of the invention relates to a method of manufacturing a composite part comprising the steps of:
preparing a layup comprising a composite material;
providing a breather element;
covering the layup and the breather element with a sheet;
establishing a reduced pressure between the sheet and the layup; and
curing the layup in an autoclave,
wherein the breather element comprises an uncompressible portion, and wherein the uncompressible portion comprises a channel to encourage fluid flow.

The breather element portion may be uncompressible under the influence of the sheet when the reduced-pressure is applied. The breather element portion may further be uncompressible under any pressure applied during the curing step.

The method may comprise the further step of providing a breather element support between the breather element and the layup.

The breather element support may form a fluid communication between the layup and the breather element.

The breather element support may comprise a first layer of breather material.

The method may comprise the step of enclosing at least a portion of the breather element with a second layer of breather material The method may comprise the step of providing a third layer of breather material. The third layer of breather material may be provided between the breather element and the first layer of breather material.

One or more of the layers of breather material may be folded over the breather element and securing the any one of said folded layers of breather material under the breather element.

The method may further comprise the step of securing the breather element with adhesive tape. The adhesive tape may be perforated. An adhesive may be used together with, or instead of, the adhesive tape.

The layup may comprise a layup support. The layup support may be a stringer.

The method may comprise the step of situating the breather element proximate the layup support.

The method may comprise the step of placing the layup on or in a tool. In this case the breather element may be located spaced from a contact region between the layup and the tool. In embodiments of the invention, the layup comprises one or more edges brought into proximity with a tool, the layup further comprising an upper surface facing away from said tool joining said edges, the breather element being located on said upper surface.

The breather element may be flexible. The breather element may comprise a tube. The tube may be formed by a folded ribbon arranged helically. The folded ribbon may be self-interlocking.

The breather element may have an outer surface formed with a helical depression. The helical depression may extend lengthwise on the outer surface. The helical depression may extend over an entire length of the portion of the breather element. Said channel may comprise a helical depression. Alternatively, said channel may be formed in an interior of said breather element whereas said helical depression may be formed on a surface of said breather element.

The sheet may comprise a bag. The sheet may be a vacuum bag.

The reduced pressure may be less than 200 mbar. Preferably, the reduced pressure is less than 100 mbar. Preferably, the reduced pressure is about 100 mbar (10 kPa).

The autoclave may operate at a temperature of 400° C. or less; preferably, between 40 and 250° C.; preferably, between 150 and 200° C.

Furthermore, the autoclave operates at an increased pressure. The increased pressure may be more than atmospheric pressure. Preferably, the autoclave operates at a pressure of 7 to 10 bar, preferably at 9 bar.

Importantly, the uncompressible portion of the breather element does not deform significantly under the increased pressure of this environment and therefore the reduced pressure between the vacuum bag and the layup is maintained consistently during the curing process.

The layup may have a length greater than 30 m. The layup may have a length greater than 40 m. The layup may have a length greater than 50 m.

The step of establishing a reduced pressure between the sheet and the layup may comprise providing a reduced pressure source. The reduced pressure source may be a channel formed in a tool. The reduced pressure source may be a pump attached to the sheet at a connection port. The connection port may be a valve. The breather element may be located at or near the reduced pressure source. The breather element may extend from the reduced pressure source along a length of the layup.

A further embodiment of the invention relates to a breather element for use in a method of manufacturing a composite part involving curing in an autoclave, said composite part comprising a composite material, said breather element comprising an uncompressible portion, and wherein the uncompressible portion comprises a channel to encourage fluid flow.

The uncompressible portion may be flexible.

The breather element may have one or more voids formed in the uncompressible portion to allow the establishment of a reduced pressure within the uncompressible portion when the breather element is located in a bag to which a vacuum pump is attached.

The breather element may be formed as a helix.

The breather element may comprise a flexible tube.

A further embodiment of the invention extends to an arrangement for use in manufacturing a composite part involving curing in an autoclave, the arrangement comprising:
 a layup comprising a composite material;
 a breather element as herein described; and
 a sheet covering the layup and the breather element.

The arrangement may further comprise a first layer of breather material between the breather element and the layup.

The arrangement may further comprise a folded layer of breather material arranged over the breather element.

The folded layer of breather material may be arranged between the breather element and the layup. The folded layer of breather material may be adhered to itself.

A further embodiment of the invention relates to a kit of parts for manufacturing a composite part involving curing in an autoclave, the kit comprising:
 a breather element;
 a sheet for covering the layup and the breather element; and
 a breather material for placing between a layup and the breather element;
 wherein the breather element comprises an uncompressible portion, and wherein the uncompressible portion comprises a channel to encourage fluid flow.

DESCRIPTION OF ACCOMPANYING FIGURES

Embodiments of the invention are described with reference to the accompanying schematic diagrams where:

FIGS. 6a to 6e illustrate different breather element and breather material arrangements;

FIGS. 7 to 9 illustrate different breather elements according to embodiments of the invention;

DESCRIPTION OF EMBODIMENTS

Figure 1:
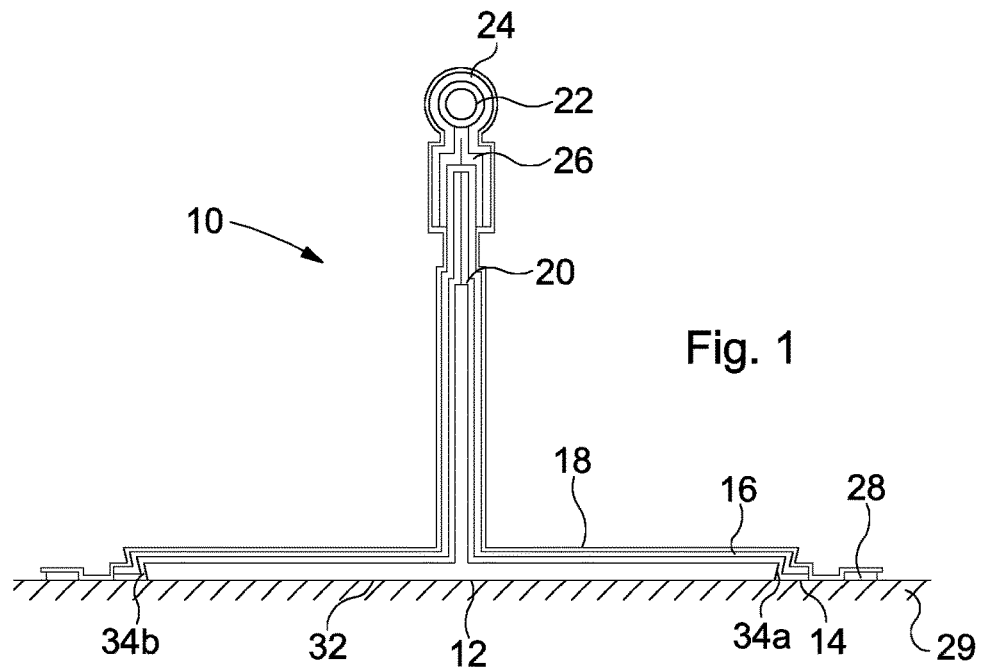
FIG. 1 is a front view of an arrangement of a breather element used in manufacturing a composite part according to a first embodiment of the invention.

FIG. 1 illustrates an arrangement 10 for use with a method of manufacturing a composite part according to an embodiment of the invention. The arrangement 10 comprises a layup 12 which is here in the form of a T-shaped stringer. The layup 12 is covered with a release film 14 which is, in turn, covered by a layer of breather material 16. Over much of the surface of the layup 12, the layer of breather material 16 is covered by a vacuum bag 18.

The vacuum bag 18 is sealed with a sealant tape 28 applied between an outer edge of the bag and the tool 29. During curing, a reduced pressure is applied to the vacuum bag 18 which causes the vacuum bag to compress the layer of breather material 16.

The T-shaped stringer layup 12 comprises an upper edge 20 situated at the base of the 'T'. As illustrated in greater detail in FIG. 2, the upper edge 20 runs the length of the layup 12. When a reduced pressure is applied to the vacuum bag 18, the edge 20 will tend to compress the layer of breather material 16 to a greater extent than a flat surface would. Therefore the edge 20 tends to interfere with the normal airflow in the breather material 16.

Therefore, in embodiments of this invention, a breather element 22 is situated near the edge 20. In this embodiment, the breather element 22 comprises an uncompressible hollow tube which is flexible. In particular, the breather element 22 is a helical metal tube as illustrated in FIG. 7, and described in greater detail below with reference to that Figure.

The breather element 22 is formed with voids (not illustrated in FIG. 1) to ensure that the vacuum which is applied to the vacuum bag 18 is transferred along the entire length of the tube by the hollow interior. In this embodiment, the hollow interior of the tube forms a channel to allow fluid (in this case air and volatiles) to flow along the length of the tube.

Therefore, the breather element serves to consistently transmit the reduced pressure along the length of the layup despite the presence of the edge 20 which would otherwise interfere with effective air flow.

Embodiments of the invention comprise uncompressible breather elements. It is to be realised that it is sufficient that the breather element is able to withstand the compressive force applied by the vacuum bag when the reduced pressure is applied to the bag as well as the increased pressure from the autoclave (which may be as much as 10 bar). It has been found that breather elements composed of steel exhibit a sufficient degree of uncompressibility.

Without derogating from the generality of the discussion herein contained, the following breather elements of the type illustrated in FIGS. 7 and 8 have been tested:
 type 65: inner diameter 6 mm, outer diameter 8.5 mm; and
 type 100: inner diameter 4.5 mm, outer diameter 6.5.

In addition, the following breather element of the type illustrated in FIG. 9 (i.e. as a spring) has been tested: inner diameter 4.5 mm, outer diameter 7 mm.

As mentioned, it has been found that stainless steel makes a good material for the breather elements but it is to be realised that other materials in the same or different arrangements with the requisite degree of uncompressability and temperature resistance would work equally well. Other materials such as different alloys or even ceramics could be used.

Referring back to FIG. 1, the breather element is surrounded by a second layer of breather material 24. A third layer of breather material 26 is further provided between a bottom edge of the breather element 22 and the top edge 20 of the layup 12. The third layer 26 is comprised of the same breather material as the second layer of breather material 24. Therefore, in addition to providing support, the third layer 26 contributes to the airflow characteristics of the arrangement 10.

It has been found that providing a second layer of breather material, preferably between the first layer of breather material and the breather element improves the performance of the breather element.

Many types of material may be used for either layer of breather material. In an embodiment, both layers are comprised of the same material.

Furthermore, since the surface area covered by the second layer of breather material is smaller than that covered by the first layer, it is viable to use a more expensive, but better performing, breather material. In such embodiments, the material of the second layer differs from that of the first layer.

In an embodiment, the first layer of breather material is a non-woven nylon material and the second layer of material is a non-woven nylon and polyester mix material. However, it is to be realised that the invention is not so limited and that any known breather materials could be used with the breather element. In particular, breather material comprised of nylon or polyester, or a combination of nylon and polyester may be used.

Figure 3:
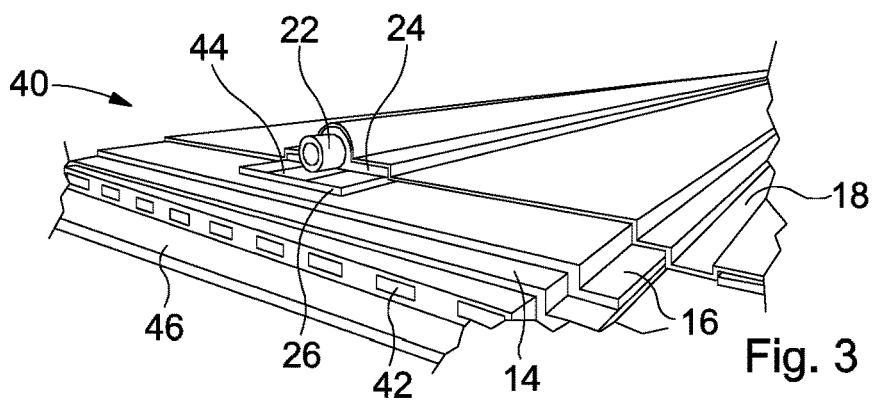
FIGS. 3 to 5 illustrate different arrangements of a breather element used in manufacturing a composite part according to further embodiments of the invention.
Figure 4:
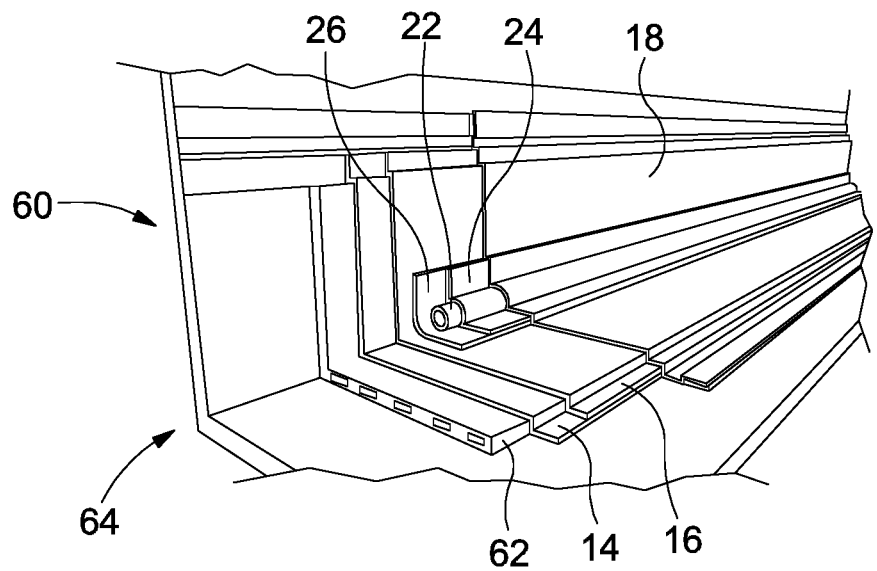
Figure 5:
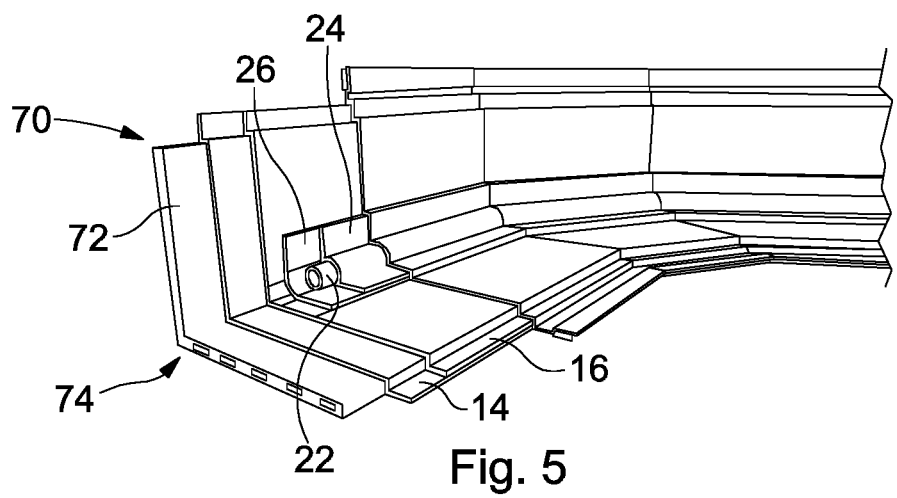

FIGS. 3 to 5 illustrate different arrangements of a breather element used in manufacturing a composite part according to further embodiments of the invention. FIG. 3 illustrates an arrangement 40 comprising a layup 42. As illustrated, the layup 42 describes a planar part and therefore does not include an edge such as the T-shaped layup of FIG. 1.

Similar reference numerals are used in FIG. 3 to refer to similar features as those depicted in FIG. 1. The arrangement 40 illustrated in FIG. 3 comprises adhesive tape 44 which adheres the breather element 22 to the third layer 26.

FIG. 4 illustrates an arrangement 60 comprising a layup 62. As illustrated, the layup 62 comprises a bend 64. The breather element 22 is located in the bend 64. This helps to alleviate airflow problems between the layup 62 and the vacuum bag 18.

FIG. 5 illustrates an arrangement 70 comprising a layup 72. As illustrated the layup comprises a bend 74. The layup 62 illustrated in FIG. 4 is longitudinal with the bend 64 running the length of the layup 62. However, the layup 62 is linear. The layup 72 of FIG. 5 differs in that the length is convoluted. In other words, the layup 72, in addition to having a bend, also describes a corner as may be found at a rounded intersection between two walls and a floor.

Although the layup 72 does not have a linear longitudinal direction, it can be viewed as the layup 62 of FIG. 4 bent into an arc. As illustrated, the breather element 22 follows the bend 74 as this too describes the corner.

In such applications where a bend or an edge may not describe a straight line, a flexible breather element is useful as it can be easily flexed to follow the shape described by the bend or the edge.

As illustrated in FIGS. 1 to 5, the breather element differs from an edge breather in that the breather element is not located at the point where the layup meets the tool.

Figure 2:
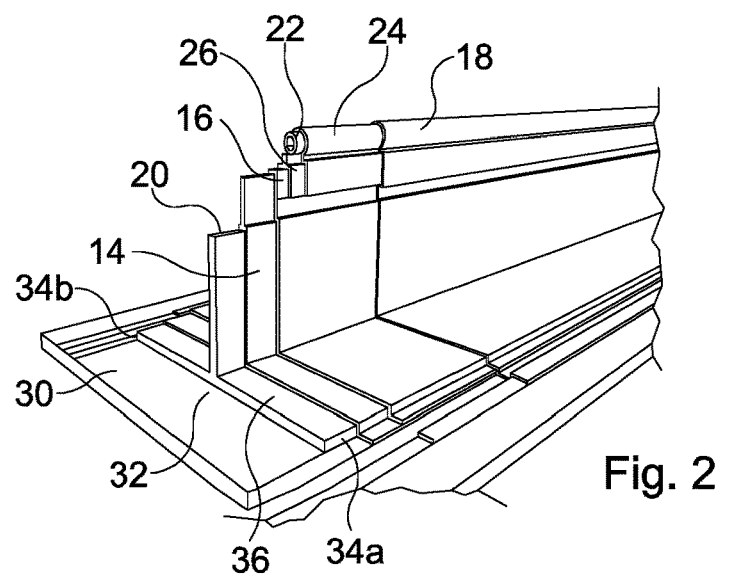
FIG. 2 is a perspective view of the arrangement of FIG. 1.

Breather elements of embodiments of the invention do not operate primarily as edge breathers. With reference to FIG. 2, the layup 12 is brought into contact with a tool 30 during the curing process. The layup has a lower surface 32 in contact with the tool 42 and edges 34a and 34b as well as an upper surface 36 opposite the lower surface 32. The breather element 22 is located on the upper surface 36, spaced from the edges 34a and 34b.

However, it is to be realised that uncompressible, hollow elements could also be used as edge breathers.

In the arrangements illustrated in FIGS. 1 to 5, there are three layers of breather material illustrated. It is to be realised however, that embodiments employing fewer layers of breather materials are also possible.

FIG. 6a illustrates the breather element surrounded by a single layer of breather material 80. In this embodiment, the breather material 80 is formed as a tube dimensioned to fit the tubular breather element 22. In this embodiment, the breather material 80 may be brought into direct contact with the layer of breather material covering the layup, and adhered thereto. In yet a further embodiment, the breather material 80 may be brought into direct contact with the release film covering the layup. This may, for example, be where the layup is shaped so that an additional layer of breather material (in addition to the layer 80) is not required.

In the embodiments illustrated in FIGS. 1 to 5, there are separate breather material layers which surround the breather element and cover the layup and provide fluid communication between the breather element and the layup. However, it is to be realised that an integrated construction of breather material, which may not necessarily be arranged as a layer, can perform these functions.

FIG. 6b illustrates the breather element 22 with a single layer of breather material 82 folded over the breather element 22. Each of the lagging ends 84 and 86 of the breather material 82 are then attached to one another underneath (in the orientation shown) the breather element 22.

FIG. 6c illustrates the breather element 22 with a single layer of breather material 88 folded around and adhered to the breather element 22. In this embodiment, the two leading strands of the breather element 90 and 92 are stretched out to either side and a second layer of breather material 94 is attached to the bottom of layer 88. In this embodiment, the layer 94 is then placed in contact with the release film over the layup.

FIG. 6d illustrates an arrangement similar to that of FIG. 6c. In the arrangement of FIG. 6d, the lower layer 94 has been folded under the breather element 22 and the two opposing surfaces adhered to one another. This is similar to the arrangement of FIGS. 1 and 2, other than the location of the release film 14 illustrated in FIGS. 1 and 2 and without the intervening layer of breather material 16 illustrated in those Figures.

FIG. 6e is similar to the arrangement illustrated in FIG. 6c, except the lower layer of breather material 94 is here bent into a corner. This is similar to the arrangement shown in FIG. 4 without the intervening layer of breather material 16 illustrated in that Figure.

In embodiments of the invention it is desirable to provide a support for the breather element for two reasons. Firstly, it is desirable to distribute the pressure the breather element exerts on the layup over a larger surface area to avoid the breather element from marking the layup. In addition, it is desirable to facilitate fluid flow between the breather element and the layup to ensure that the reduced pressure applied to the vacuum bag is maintained and to assist with the removal of volatiles during the curing process.

The breather element support serves to fulfil both of these functions in embodiments of the invention. In certain embodiments, the support is provided by a single layer of breather material (e.g. FIG. 6a) or a single layer which has been folded (FIG. 6b). In alternative arrangements, the support may be provided by two or more layers. Where those layers extend over the surface of the layup or the breather element, it is to be realised that only the portion of those layers between the breather element and the layup will act as a breather element support.

With reference to FIGS. 3 to 6, the breather element is situated on the upper surface spaced from the edges of the layup, wherein the upper surface is opposed to a surface of the layup in contact with the tool. The contact may be direct or indirect. If the contact is indirect, the layup may be separated from the tool by a release film, breather material or other known interstitial materials.

FIGS. 7 to 9 illustrate breather elements used with embodiments of the invention. FIG. 7 illustrates a breather element 90 formed as a tube. The tube is comprised of an interlocking helical metal ribbon and is similar to the tubes found on hand-held showers. The helical ribbon interlocks with itself in a non-sealing arrangement, thereby allowing airflow into and out of the hollow interior.

The breather element 90 has a helical channel running along its length formed by an indent 94. The corresponding raised portion 92 defines an outer surface of the breather element 90.

FIG. 8 illustrates a breather element 100 for use with a further embodiment of the invention. The breather element 100 is comprised, similarly to the breather element 90 of FIG. 7, of an interlocking metal helical ribbon. The breather element 100 of FIG. 8 comprises a helical channel 104 running along its length having a corresponding raised helical portion 102 forming an outer surface. However, the breather element 100 differs from the breather element 90 of FIG. 7 in the dimensions of the ribbon.

The breather elements 90 and 100 are uncompressible under the force which the vacuum bag places thereon when the reduced pressure is applied. Furthermore, the breather elements are able to withstand the pressures within the autoclave. The interlocking ribbon arrangement provides a flexibility which allows the breather element to follow any contours described by the layup, such as that illustrated in FIG. 5.

FIG. 9 illustrates a breather element 110 for use with embodiments of the invention. The breather element 110 is formed as a metal helix in the shape of a spring. Voids between the coils of the spring allow for airflow. The breather element 110 is significantly cheaper that the breather elements 90 and 100 of FIGS. 7 and 8, but is less flexible, and is better suited to applications where there are few or no contours described by the layup.

Figure 10:
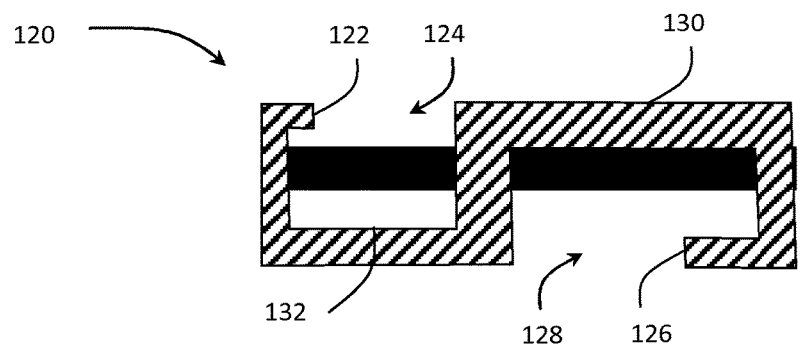
FIG. 10 is a cross section of a tape used in the construction of certain breather elements.

FIG. 10 illustrates a cross-section through a stainless steel ribbon 120. The stainless steel ribbon 120 is folded into an S-shape with two tabs 122 and 126 at the ends of the 'S'. The S-shape defines two hollows 124 and 128. During manufacture of the tube which comprises breather elements according to embodiments of the invention, the ribbon is orientated so that the S-shape is orientated length-wise along the circumference of the tube. In this orientation, the outer surface of the ribbon comprises a raised shoulder 130 and an indented shoulder 132.

During manufacture, the ribbon is coiled into a helix so that tab 122 is located in the hollow 128 of the subsequent coil, whereas tab 126 is located in the hollow 124 of a preceding coil. In this arrangement, the raised shoulder forms the outer surface of the breather element (corresponding to raised helical portions 92 and 102 of FIGS. 7 and 8) whereas the indented shoulder forms an indented surface of the breather element (corresponding to helical channel 94 and 104).

Furthermore, it is to be realised that the manner in which the ribbon 120 interlocks when coiled allows flexibility due to the play of the tabs located in the respective hollows. It is also to be realised that the location of the tabs in the hollows allows for the movement of fluid such as air between an interior of the tube and the exterior.

The helical channels 94 and 104 act along the length of the breather element to help establish and maintain the reduced pressure between the layup and the vacuum bag. Breather elements such as those illustrated in FIGS. 7 and 8 have a channel formed in the interior and a helical depression running along the length where fluid is permitted to freely flow between the interior and the exterior.

It is to be realised that where the breather element is a spring (see FIG. 8) and this is covered by a layer of breather material and a vacuum bag, when a reduced pressure is applied to the vacuum bag, this will tend to encourage the breather material into the spaces between the coil of the spring. This will, in turn, form a helical channel on the outer surface of that breather element.

Figure 11A:
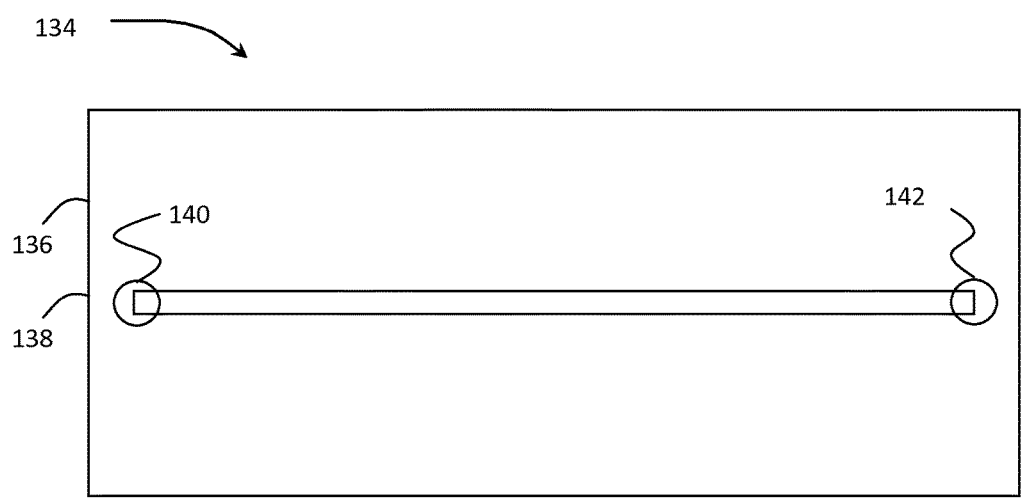
FIGS. 11a and 11b illustrate the location of a breather element relative to an arrangement for manufacturing a composite part.

FIG. 11a illustrates an arrangement for manufacturing a composite part 134 of the type illustrated in FIGS. 1 to 5. The arrangement 134 includes two valves 140 and 142 which connect the vacuum bag to a pump so that the reduced pressure can be formed in the vacuum bag. Therefore, the valves 140 and 142 act as sources of reduced pressure.

In an alternate arrangement, valve 142 is attached to a pressure sensor instead.

The arrangement 134 includes a breather element 138. As illustrated, the arrangement 134 is longitudinal and the breather element 134 runs along the length of the layup of the arrangement with either end of the breather element located in the valves 140 and 142. This helps to ensure that the reduced pressure is maintained evenly and consistently throughout the entire arrangement 134.

Figure 11B:
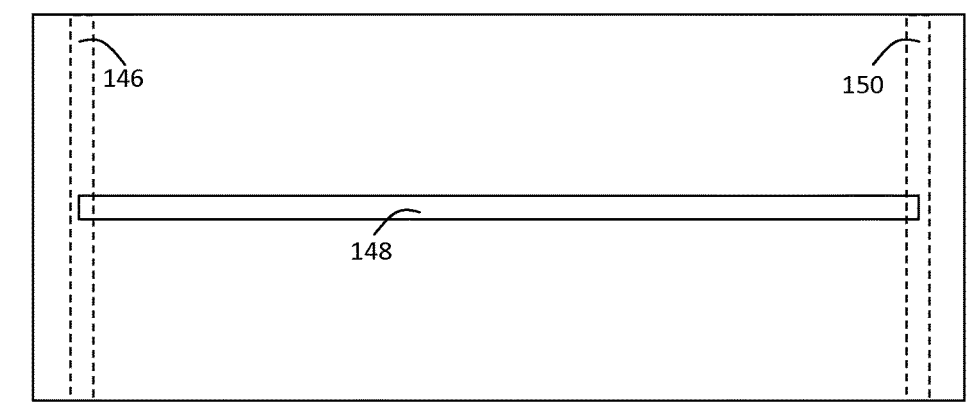

FIG. 11b illustrates an arrangement 144 similar to the arrangement 134 of FIG. 11a. In the arrangement 144, the reduced pressure sources are provided by two channels 146 and 150 formed in the tool. The breather element 148 extends along a length of the layup of the arrangement 144 with either end located in respective channels.

In an alternative arrangement, the tool is provided with a single peripheral channel in which the breather element is located.

Figure 12:
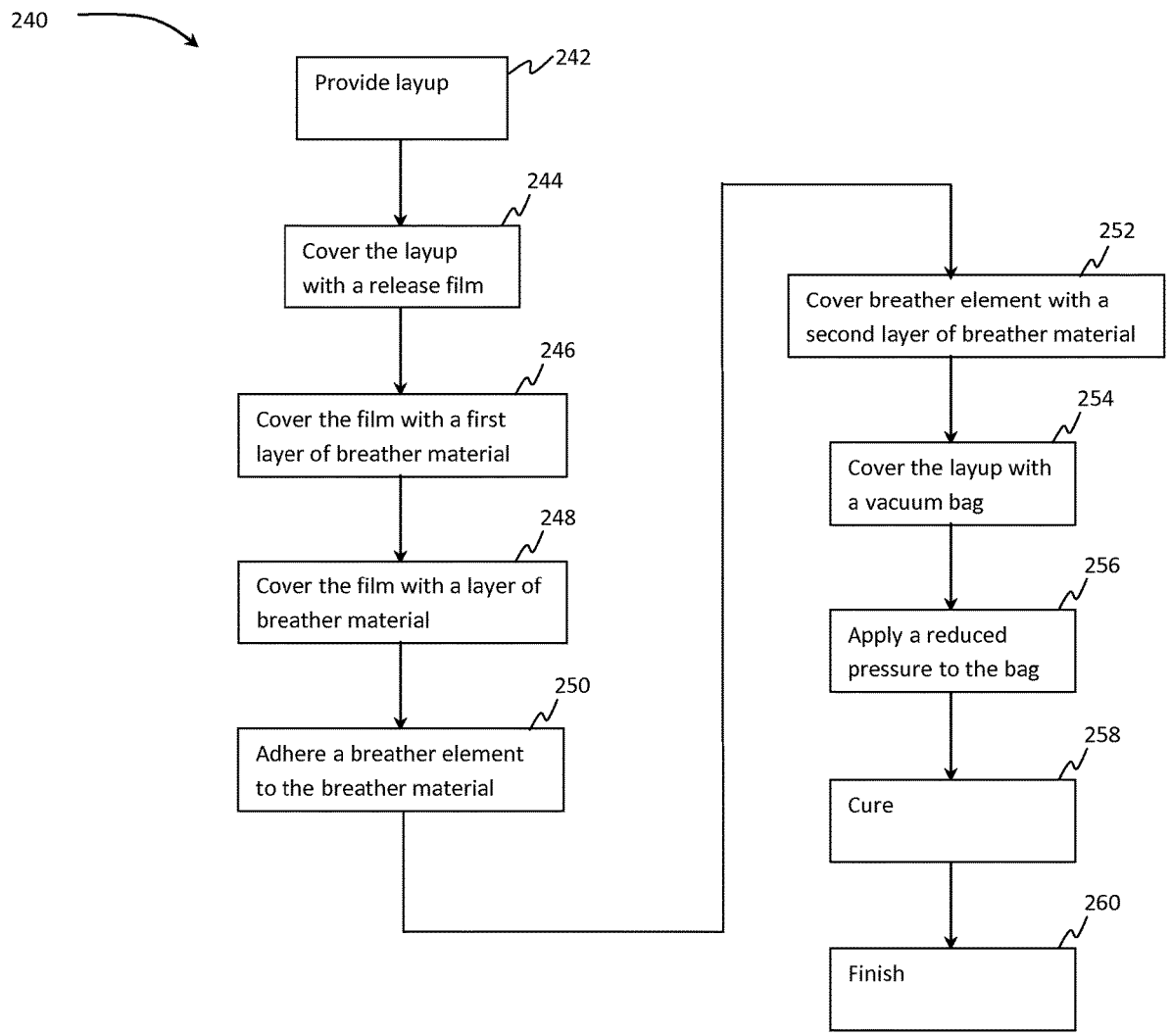
FIG. 12 illustrates a method of manufacturing a composite part according to an embodiment of the invention.

FIG. 12 illustrates a method 240 of manufacturing a composite part according to an embodiment of the invention. At the first step 242, the layup is provided. As illustrated in FIGS. 1 to 5, the layup may have different shapes and sizes. In particular, it has been found that the application of a hollow, uncompressible breather element has certain advantages where the layup includes an edge, bend, contour or similar formation which may impede airflow. Furthermore, the use of this breather element has certain advantages where the size of the layup exceeds certain dimensions.

In this embodiment, the layup is provided by placing it on a tool. In general, in such vacuum bagging manufacturing techniques, the layup will have a lower surface which is placed in contact with the tool first, and then the various breather materials and films are applied. However, it is to be realised that the sequence with which all of these steps are carried out is not important to embodiments of the invention.

In certain embodiments, the layup may have a length greater than 30 m. In further embodiments, the layup has a length greater than 40 m. In further embodiments, the layup has a length greater than 50 m.

The embodiment of FIG. 12 will be explained with reference to the layup illustrated in FIG. 1, although it is to be realised that the general method is not limited to this type or shape of layup.

Referring back to FIG. 12, at the second step, step 244, the layup is covered with a release film. At the following step, step 246, the release film is covered with a first layer of breather material. In this embodiment, the breather material is a non-woven nylon material.

At step 248, a layer of breather material is attached to the first layer of breather material (this is the third layer referred to in reference to FIGS. 1 to 3). In this embodiment, the breather material of this layer is a non-woven nylon and polyester mix material.

At step 250, the breather element is attached to the breather support with an adhesive tape. In a further embodiment, a perforated adhesive tape may be used. The perforations assist in fluid flow.

However, it is to be realised that the use of an adhesive tape is not an essential element. In further embodiments, an adhesive may be used, or the adhesion may be dispensed with all together.

In this embodiment, a release film is used. However, a peel ply may be used as well as, or instead of, the release film.

In the following step, step 252, the breather element is covered with a second layer of breather material. In this embodiment, the second layer of breather material is also a non-woven nylon and polyester mix material.

The three layers of breather material between the breather element and the release film act as a breather element support, as discussed above.

The layup, including the release film, breather materials and breather element is covered in a vacuum bag at step 254 and the vacuum bag is connected to a pump which applies a reduced pressure to the bag at step 256. In this embodiment, the bag is evacuated to a pressure of 100 mbar.

The arrangement including the layup and tool are then placed in an autoclave in step 258 where the arrangement is heated to a temperature of 180° C. at a pressure of 9 bar.

At the final step, step 260, the composite part is finished. This can involve removal of the films, breather material and breather element and any other steps required before the composite part is ready for further transport.

Advantageously, the breather element according to certain embodiments may then be reused.

The invention claimed is:

1. A method of manufacturing a composite part comprising the steps of:

preparing a layup having edges and an upper surface, the layup comprising a composite material;
providing a breather element situated on the upper surface of the layup and spaced from the edges of the layup;
providing a first layer of breather material between the breather element and the layup;
covering the layup and the breather element with a sheet;
establishing a reduced pressure between the sheet and the layup; and
curing the layup in an autoclave operating at an increased pressure which is more than atmospheric pressure,
wherein the breather element comprises an elongate uncompressible portion including a tube having a hollow interior defining a channel to encourage fluid flow, wherein the tube and the channel extend between the sheet and the layup, wherein the tube is elongated in a direction substantially parallel to the sheet and the layup and the channel extends in the direction substantially parallel to the sheet and the layup, wherein the breather element portion is uncompressible in the increased pressure of the autoclave under the influence of the sheet when the reduced pressure is applied, and wherein the elongate portion of the breather element is situated between the sheet and the layup to transfer the reduced pressure to the layup over the elongate uncompressible portion; and
wherein the method further comprises providing one or more layers of breather material, the one or more layers including the first layer of breather material, and folding one or more of the one or more layers of breather material over the breather element and securing any one of said folded layers of breather material under the breather element.

2. The method of claim 1 further comprising the step of enclosing at least a portion of the breather element with a second layer of breather material.

3. The method of claim 1 comprising the step of providing a third layer of breather material between the breather element and the first layer of breather material.

4. The method of claim 1 further comprising the step of securing the breather element with adhesive tape.

5. The method according to claim 4 wherein the adhesive tape is perforated.

6. The method according to claim 1 wherein the layup comprises a layup support.

7. The method according to claim 6 further comprising the step of situating the breather element proximate the layup support.

8. The method according to claim 1 wherein the breather element is flexible.

9. The method according to claim 1 wherein the breather element has an outer surface and wherein the outer surface is formed with a helical depression.

* * * * *